United States Patent
Otana

(10) Patent No.: US 7,978,358 B2
(45) Date of Patent: Jul. 12, 2011

(54) DOUBLE-SIDED IMAGE FORMING DEVICE

(75) Inventor: Aiichiro Otana, Mie (JP)

(73) Assignee: Kyocera Mita Corporation (JP)

( * ) Notice: Subject to any disclaimer, the term of this patent is extended or adjusted under 35 U.S.C. 154(b) by 1123 days.

(21) Appl. No.: 11/727,794

(22) Filed: Mar. 28, 2007

(65) Prior Publication Data

US 2007/0258107 A1    Nov. 8, 2007

(30) Foreign Application Priority Data

Mar. 30, 2006    (JP) ................................. 2006-094438

(51) Int. Cl.
*G06F 3/12* (2006.01)
*H04N 1/00* (2006.01)

(52) U.S. Cl. ...... 358/1.15; 358/403; 358/528; 358/3.07; 358/537

(58) Field of Classification Search .................... 358/1.2, 358/451, 528, 3.07, 1.15, 1.16, 537, 452, 358/403, 404, 444; 348/806, 807, E3.045, 348/447, 448; 382/305
See application file for complete search history.

(56) References Cited

U.S. PATENT DOCUMENTS

| | | | |
|---|---|---|---|
| 4,603,350 A * | 7/1986 | Arbeiter et al. | 348/448 |
| 5,134,495 A | 7/1992 | Frazier et al. | |
| 5,521,715 A * | 5/1996 | Verhaag et al. | 358/401 |
| 5,606,481 A * | 2/1997 | Heep et al. | 361/56 |
| 6,069,662 A * | 5/2000 | Horiuchi et al. | 348/446 |
| 2005/0185092 A1* | 8/2005 | Tanaka | 348/447 |

FOREIGN PATENT DOCUMENTS

JP    3275050 B    5/1994

* cited by examiner

*Primary Examiner* — Twyler L Haskins
*Assistant Examiner* — Dennis Dicker
(74) *Attorney, Agent, or Firm* — Ostrolenk Faber LLP

(57) ABSTRACT

The present invention provides an image forming device that forms visible images by scanning in a first scan direction and a slow scan direction that is perpendicular to the first scan direction, image data that are arranged in the first scan direction and the slow scan direction. The image data include actual latent image lines formed from actual data, and artificial latent image lines formed using the actual data. The image forming device has a data storage unit that stores the image data so that the total number of scan lines in the image data from one end to the other end in the slow scan direction is an odd number.

10 Claims, 6 Drawing Sheets

DOUBLE-SIDED IMAGE FORMING DEVICE

CROSS-REFERENCE TO RELATED APPLICATIONS

This application claims priority to Japanese Patent Application No. 2006-094438 filed on Mar. 30, 2006. The entire disclosure of Japanese Patent Application No. 2006-094438 is hereby incorporated herein by reference.

BACKGROUND OF THE INVENTION

1. Field the Invention

The present invention generally relates to an image forming device. More specifically, the present invention relates to an image forming device having a data storage unit that stores image data.

2. Background Information

In image forming devices, resolution enhancement technology is used in which a dot to be printed is resolved to ¼ or ⅛, and jaggedness that occurs in sloping lines or the like is corrected so that the jaggedness does not stand out. This resolution enhancement is disclosed in Japanese Patent No. 3275050, which was registered on $8^{th}$ Feb. 2002 (see especially column 26 line 49 to column 27 line 16, FIG. 17).

In the enhanced resolution method, an artificial latent image shown by the broken line in FIG. 4 is interleaved between two actual latent images shown by the solid lines. Therefore, as shown in FIG. 5, artificial latent image lines 2 known as interleave scan lines are disposed in a position between actual latent image lines 1 known as physical scan lines. By interleaving the artificial latent image between actual latent image and actual latent image the resolution is increased. Note that, in FIG. 4, the horizontal axis shows scanning position and the vertical axis shows exposure intensity.

As shown in FIG. 4, the artificial latent image line is a pseudo line which is formed by overlapping exposure of two actual latent image lines in the slow scan direction. The exposure intensity of the aforementioned two actual latent image lines is adjusted properly in order to form the artificial latent image line.

However, in image forming devices it is possible to select a mode in which characters and the like are printed on both sides of a sheet. For example, as shown in FIG. 6A, on the first sheet of a rectangular document 4 the characters "ABCD" are written parallel to the short edge which is the first scan direction. Then, as shown in FIG. 6B, on the second sheet of the document 5 the characters "EFGH" are written parallel to the same short edge. An image forming device reads the document 4 and the document 5 in the slow scan direction, indicated by the arrows, that is perpendicular to the short edge. Then, as seen in FIG. 6C, the image forming device prints the characters "ABCD" of the document 4 on a printing sheet 6. Also, the image forming device carries out double sided printing by for example reversing the sheet 6 in the same slow scan direction, and printing the characters "EFGH" of the document 5.

By carrying out double-sided printing in this way, the characters printed on a first side and the second side of the sheet 6 are reversed in the vertical direction, as shown in FIG. 6C. If the sheet 6 that has been printed on both sides in this way is bound on one short edge (hereafter referred to as short edge binding), the sheet 6 is turned about the one short edge as center. Therefore when the sheet 6 is turned, the characters on the second side will appear normally in the vertical direction.

When bound along a long edge, the sheet 6 is turned about the long edge as center. In addition, when the sheet 6 is turned, the characters on the second side are reversed in the vertical direction with respect to the characters on the first side. To prevent this reversal, it is necessary to reverse the characters on the second side in the vertical direction. In other words, it is necessary to reverse the sweep direction of the characters on the second side.

In an image forming device such as a digital multi-function printer or the like, the image data read from documents such as those shown in FIG. 6A and FIG. 6B are temporarily stored in memory or the like. Assuming it is not possible to change the direction of transport of the sheets in the printer, when printing in the long edge binding mode using image data as described above, it is necessary to read the image data on the first side from the top in the slow scan direction, and read the image data on the second side from the bottom.

The following is an explanation of printing an A4 sheet with long edge binding using 1200 dpi resolution enhancement, using this type of image data as an example. An A4 sheet has a rectangular shape whose size in the respective horizontal and vertical directions is 210 mm by 297 mm. If a margin of 5 mm is allowed at the top and bottom of an A4 sheet, the scan area from one end to the other end in the vertical direction is 287 mm in the slow scan direction. One inch is 25.4 mm, so the number of scan lines is 1200×287/25.4=13,359.055, so 13,360 scan lines are required.

FIGS. 7A and 7B diagram the 13,360 lines of this image data. For convenience of explanation, the image data of FIG. 7B is the same as the image data of FIG. 7A but reversed in the vertical direction. Assume that FIGS. 7A and 7B show the dots for printing a slanted line. As shown in FIG. 7A, the image data include scan lines 1 through 13,360. When the total number of scan lines is an even number, the actual latent image lines and the artificial latent image lines become interchanged when reversed in the vertical direction, as shown in FIG. 7B.

In other words, as shown in FIG. 7A, when printing image data in the forward direction (here, one direction is referred to as the forward direction, and the opposite direction is referred to as the reverse direction), odd numbered lines are actual latent image lines, and even numbered lines are artificial latent image lines. Here, for example, focus on the last line, number 13,360, of FIG. 7A. This line is an even numbered line so it is an artificial latent image line. In contrast to this, when reversed in the vertical direction and printed, as shown in FIG. 7B, the line corresponding to line 13,360 in FIG. 7A is line 1 in FIG. 7B. In other words, the line has become an odd numbered line so that it is an actual latent image line. In this way, as shown in FIG. 7A, odd-numbered lines of the image data that are read in the forward direction and drawn as actual latent image lines become even-numbered lines in FIG. 7B and are drawn as artificial latent image lines. Even-numbered lines that are drawn as artificial latent image lines in FIG. 7A become odd-numbered lines and are drawn as actual latent image lines in FIG. 7B. However, there is a problem that the density and tone of an image as a whole changes depending on whether a part of the same image is drawn as an actual latent image or as an artificial latent image.

The actual latent image lines are in positions corresponding to physical scan lines based on the actual data. In contrast, the artificial latent image lines are located at interleaved scan lines between physical scan lines. If the same dot is printed, the density and tone of the actual latent image and the artificial latent image will be subtly different.

In view of the above, it will be apparent to those skilled in the art from this disclosure that there exists a need for an improved image forming device. This invention addresses this need in the art as well as other needs, which will become apparent to those skilled in the art from this disclosure.

SUMMARY OF THE INVENTION

Therefore, it is an object of the present invention to provide an image forming device for which when carrying out double-sided printing, the difference in density and tone of images formed on the first side and the second side is small.

The image forming device according to the present invention is an image forming device that forms visible images by scanning image data in the first scan direction and the slow scan direction. The image data are arranged in a first scan direction and a slow scan direction that is perpendicular to the first scan direction. The image data include actual latent image lines that constitutes the actual data and artificial latent image lines interleaved between the actual latent image lines, in the slow scan direction. A data storage unit is provided that stores image data so that the total number of scan lines when scanning in the slow scan direction from one end to the other end is an odd number.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
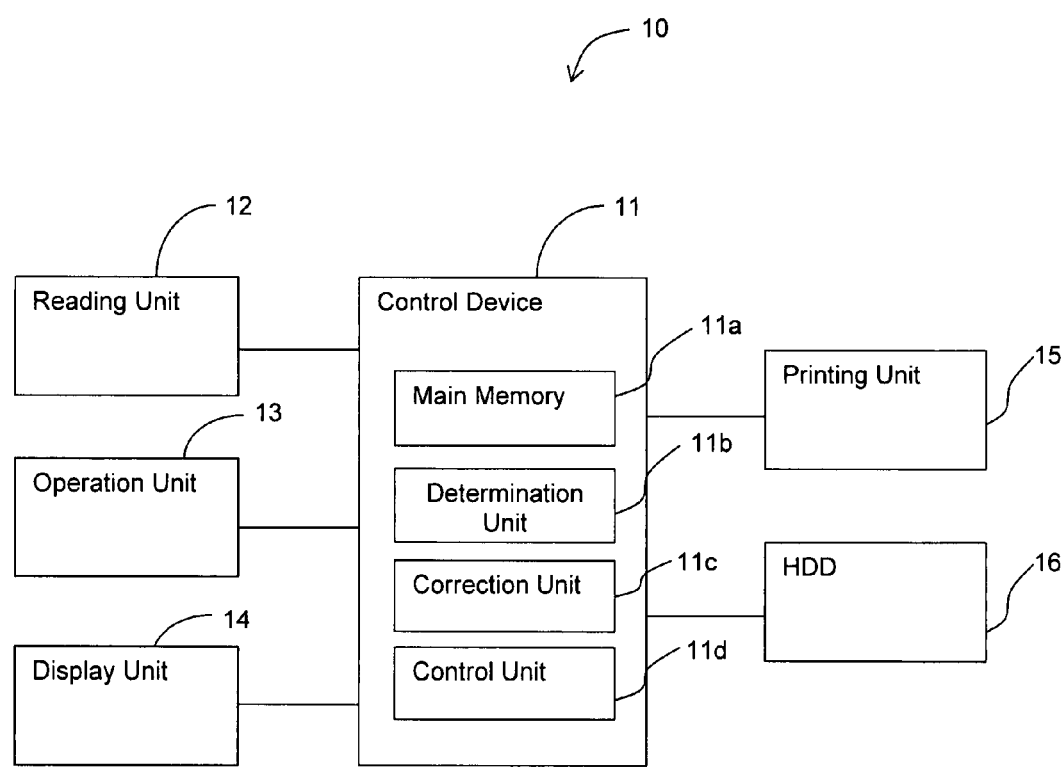
FIG. 1 is a view of a block diagram showing an embodiment of the image forming device according to a preferred embodiment of the present invention.

FIG. 1 is a view of a block diagram showing an image forming device 10 according to an embodiment of the present invention. The image forming device 10 may be implemented as, for example, a digital multi-function printer, a facsimile, or a printer, and so on. The image forming device 10 includes a control device (data storage unit) 11, a reading unit 12 connected to and controlled by the control unit 11, an operation unit 13, a display unit 14, a printing unit 15, and a hard disk (HDD) 16. The control device 11 includes a main memory 11a, a determination unit 11b, a correction unit 11c, and a control unit 11d.

The reading unit 12 reads documents to obtain image data. The image data obtained by the reading unit 12 are stored in the main memory 11a, and when necessary are stored in the HDD 16. Also, image data that are stored in the HDD 16 can be called up into the main memory 11a when necessary, and used for printing and so on. The operation unit 13 receives operation commands from users. The operation unit 13 transmits the details received from a user, for example, the number of copies to be printed and other printing conditions, to the control unit 11. The display unit 14 displays the sheet size, and the like for the user. The printing unit 15 prints the images that have been read onto sheets. The HDD 16 stores many types of data.

Figure 2:
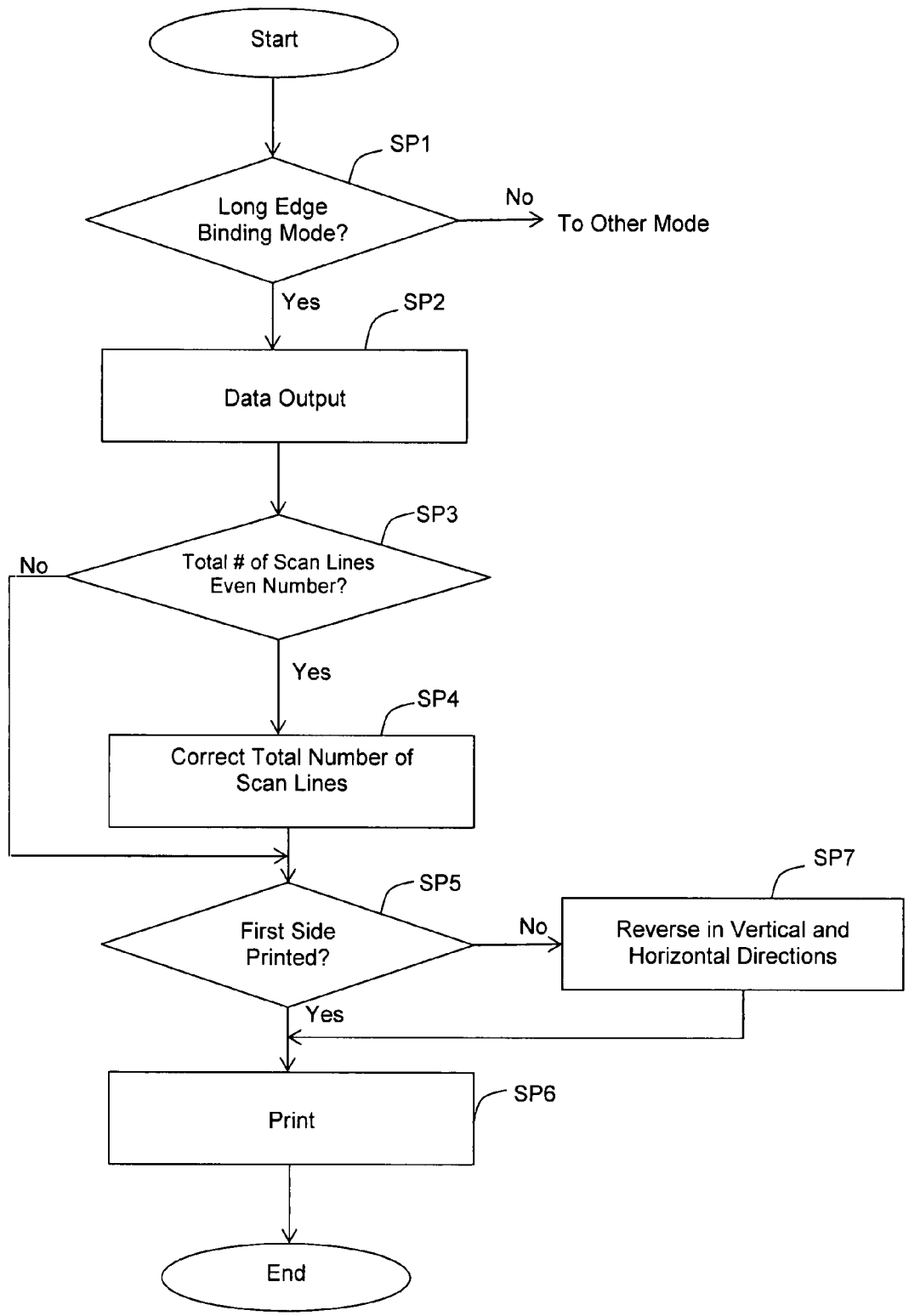
FIG. 2 is a view of a flowchart explaining the operation of the image forming device according to the preferred embodiment of the present invention.
Figures 3A, 3B:
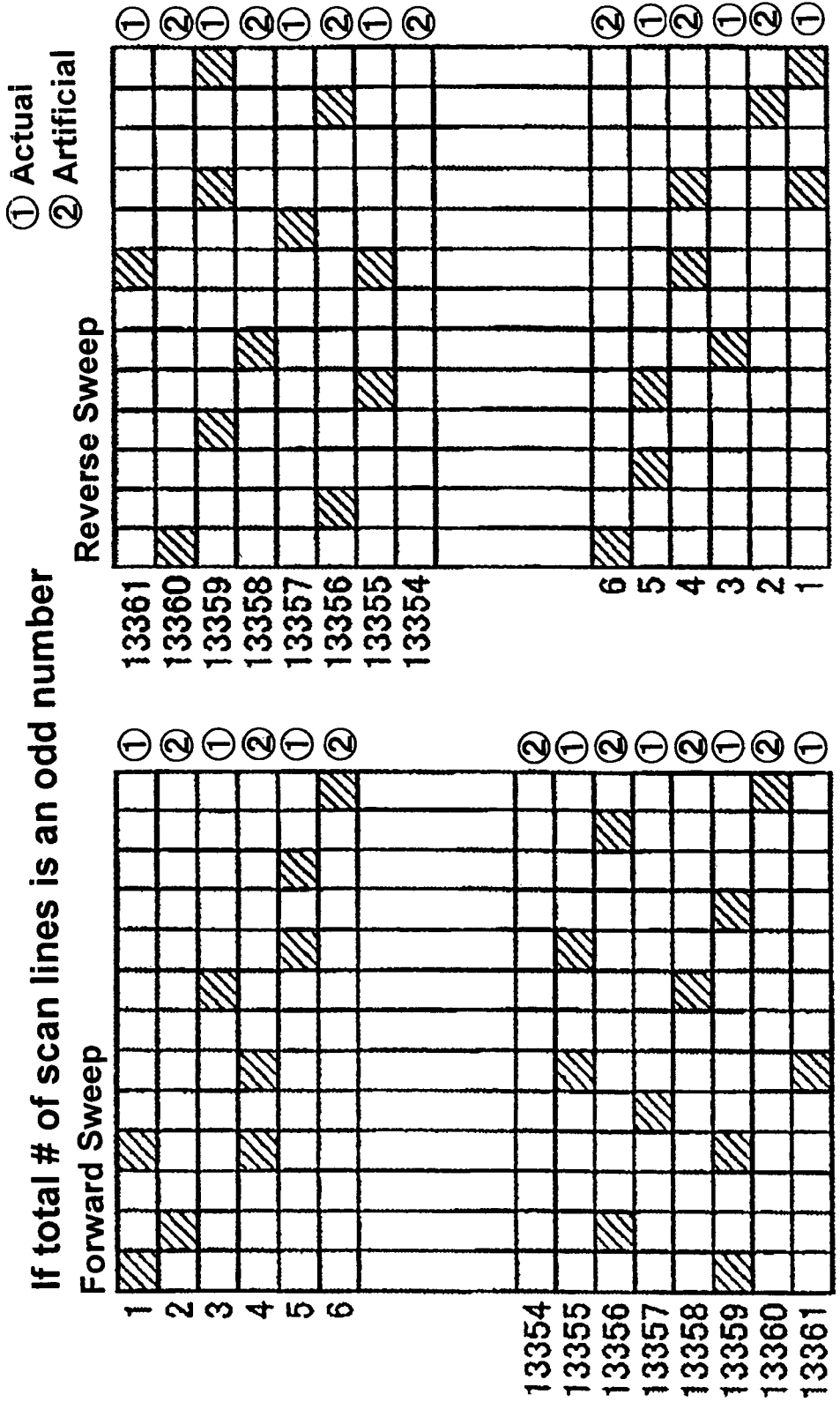
FIG. 3A is a view of a diagram showing first side data output by the image forming device according to the preferred embodiment of the present invention.
FIG. 3B is a view of a diagram showing second side data output by the image forming device according to the preferred embodiment of the present invention.
Figure 4:
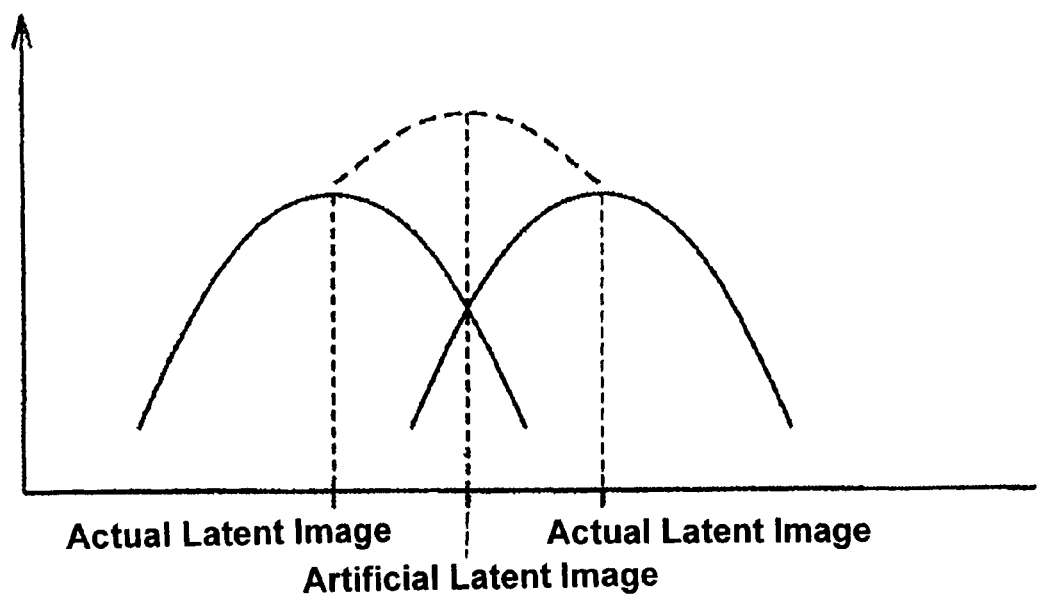
FIG. 4 is a view of a diagram showing an actual latent image and an artificial latent image in a resolution enhancement method.
Figure 5:
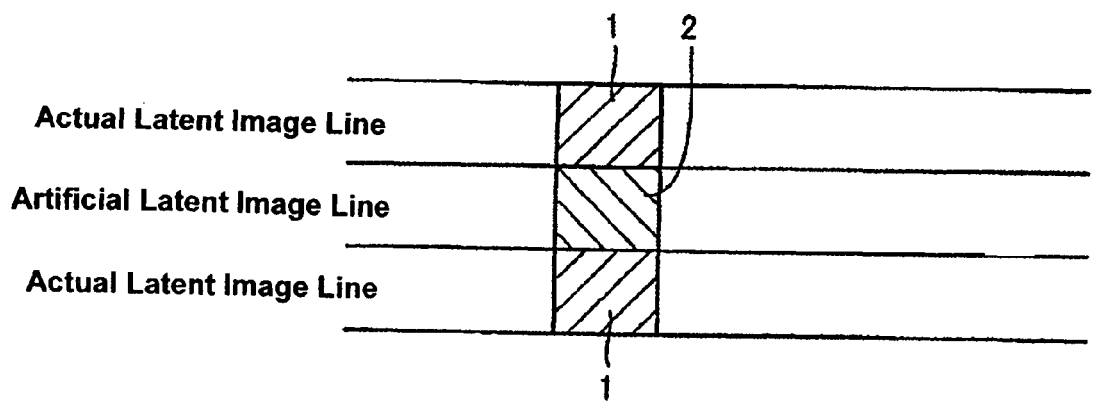
FIG. 5 is a view of a diagram showing actual latent image lines and an artificial latent image line.
Figure 6A:
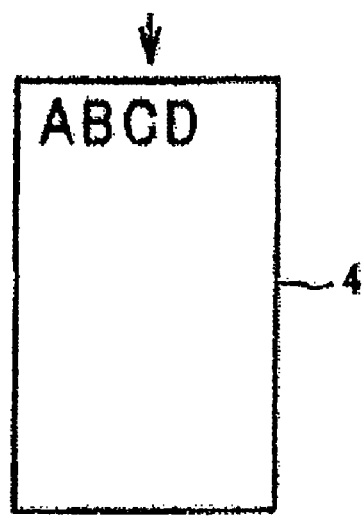
FIG. 6A is a view of a diagram showing a document with an image.
Figure 6B:
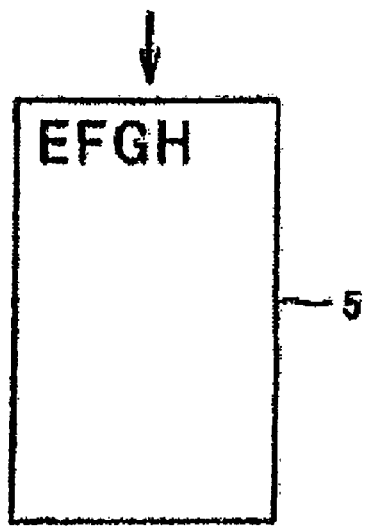
FIG. 6B is a view of a diagram showing another document with an image.
Figure 6C:
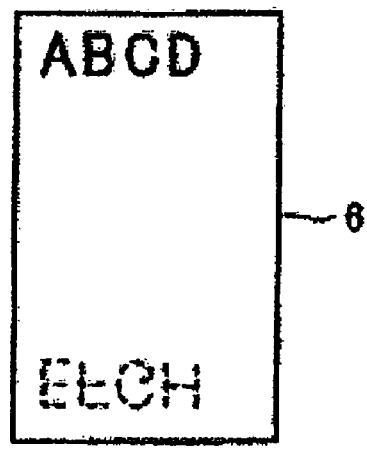
FIG. 6C is a view of a diagram showing a sheet on which the image on the document of FIG. 6A is printed on one side, and the image on the document of FIG. 6B is printed on the other side.

FIG. 2 is a view of a flowchart explaining the operation of the image forming device 10 according to an embodiment of the present invention. FIG. 3 is a diagram showing the data output by the image forming device 10 according to an embodiment of the present invention. FIG. 3A shows the data on the first side (for example, the front surface of a sheet), and FIG. 3B shows the data on the second side (for example, the reverse surface of a sheet). For convenience of explanation, the image data of FIG. 3B are the same as the image data of FIG. 3A but reversed in the vertical direction.

Referring to FIGS. 1-3, in Step (abbreviated as SP) SP1, the control unit 11 determines whether the long edge binding mode has been set. If the long edge binding mode has not been set (NO at SP1), the control unit 11 determines whether another process has been set, such as the short edge binding mode (other modes). If it is determined that the long edge binding mode has been set (YES at SP1), in Step SP2 the image data in the main memory 11a are read into the determination unit 11b and the correction unit 11c. In Step SP3, the determination unit 11b determines whether the total number of scan lines in the slow scan direction from one end to the other in the printing area of a sheet is an even number. If the total number of scan lines is an even number, in Step SP4, the correction unit 11c corrects the total number of scan lines in the image data read from the memory. If the total number of scan lines is an odd number, the routine proceeds to Step SP5 without correcting the total number of scan lines.

The data stored in the main memory 11a are the data to be printed in the printing area for a single page. If the total number of scan lines in the printing area is an even number, the total number of scan lines in the stored data is also an even number.

Figures 7A, 7B:
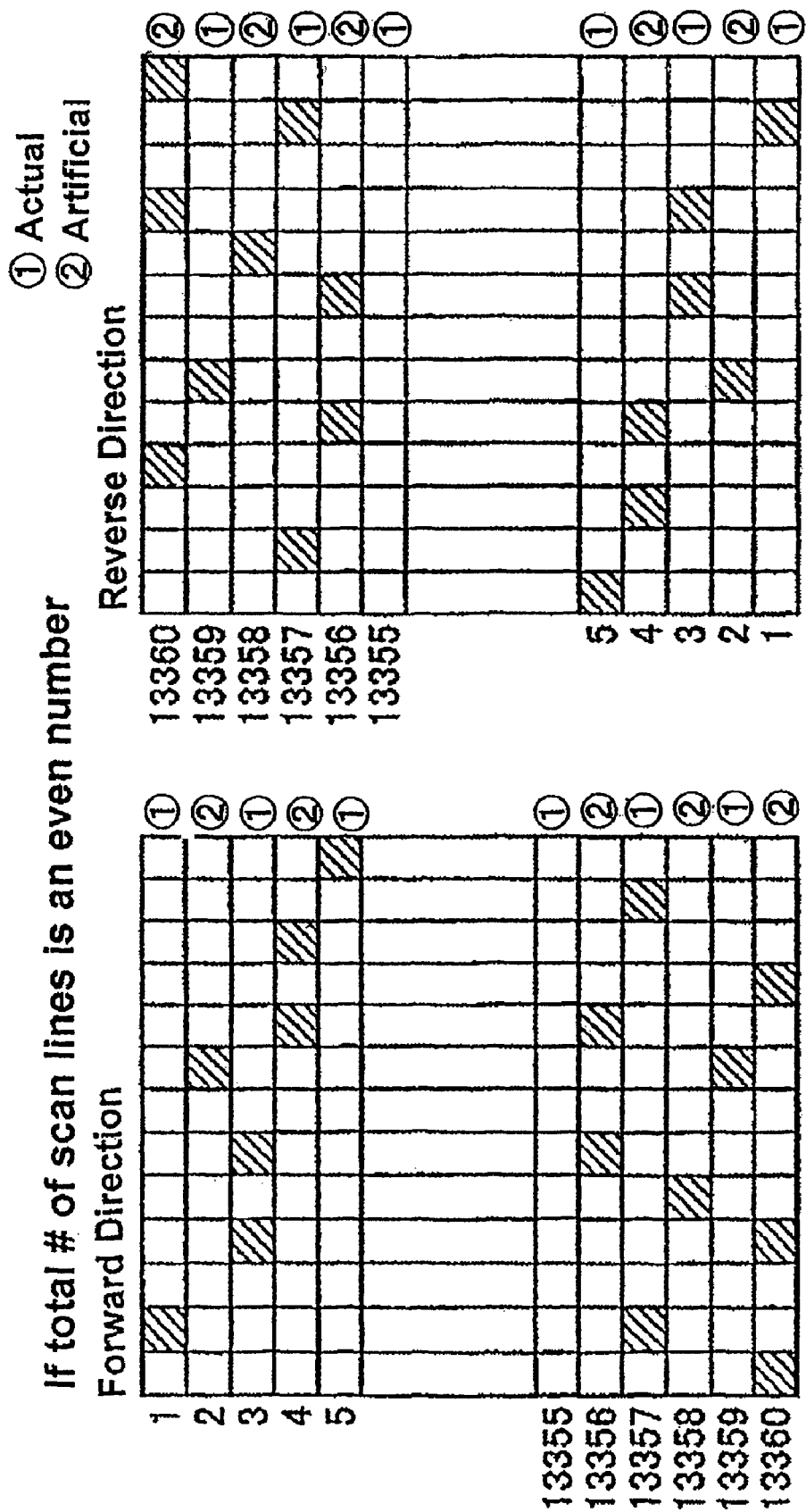
FIG. 7A is a view of a diagram showing the forward direction data for a case in which the total number of scan lines is an even number.
FIG. 7B is a view of a diagram showing the reverse direction data for a case in which the total number of scan lines is an even number.

Here the correction of the total number of scan lines is explained with a specific example. In this example, as was explained in the case of FIG. 7A and so on, it is assumed that an A4 sheet is being printed with binding on the short edge, and with 1200 dpi resolution enhancement. In other words, this is a case that normally requires 13,360 scan lines in the slow scan direction. However, as it stands, the number of scan lines is an even number. Therefore in this example the correction unit 11c adds one line of scan line data as shown in FIG. 3A. Therefore the total number of scan lines in the slow scan direction becomes 13,361, in other words, the total number of scan lines has been corrected to an odd number. Also, the total number of scan lines may also be reduced by one to obtain an odd number of scan lines. In other words, provided the total number of scan lines can be made into an odd number, there is no specific limitation on the correction method.

The total number of scan lines is determined in advance by the sheet size. In other words, if the sheet size is A4, the determination unit 11b may determine that the total number of scan lines in the slow scan direction is an even number. In this case also, as stated above, based on the result of the determination of the determination unit 11b that the total number of scan lines is an even number, the correction unit 11c may change the total number of scan lines into an odd number by either adding one scan line or subtracting one scan line.

In Step SP5, the control unit 11d determines whether the printing to be executed is on the first surface. If the printing to be executed is on the first surface, in Step SP6, the control unit 11d controls the printing unit 15 to read and to carry out a forward sweep of the data for the $1^{st}$ through 13,361 scan lines in turn from the top, as shown in FIG. 3A. In other words, the printing unit 15 scans the image data in a first scan direction and slow scan direction perpendicular to the first scan direction. The image data contain actual latent image lines formed from actual data, and artificial latent image lines formed from using the actual data. The printing unit 15 prints out the image data from one end of the supplied sheet. If the printing to be executed is not the first surface, then it is the second surface, so in Step SP7 the control unit 11d reverses the data in the vertical direction, as shown in FIG. 3B. Then in Step SP6 the control unit 11d controls the printing unit 15 to read the data in the order of scan lines 13,361 to 1 (reverse sweep), and execute the printing.

In this way, if the long edge binding mode is set, and if the total number of scan lines in the slow scan direction from one end to the other end of the printing area is an even number, the total number of scan lines of data to be printed in the slow scan direction is corrected to an odd number. Therefore even if the direction of reading the data to be printed on the second surface is reversed in the vertical direction compared to printing on the first surface, it is possible to maintain consistently the same part of an image as either an actual scan line or an artificial scan line. As a result, there are no small changes in image density or tone between the first surface and the second surface.

The area of the main memory 11a that stores the data may be configured so that there is an odd number of scan lines in the slow scan direction. In this way, the total number of scan lines of image data will automatically be an odd number.

Also, in the above explanation, an example was explained for the case of image forming in the long edge binding mode. However, the present invention is not limited to this. The present invention may be applied to a printer, and used in any case in which images are formed by reading the scan data in the direction opposite to the slow scan direction.

Each block of the image forming device 10, in particular the control unit 11, may be constituted by hardware logic, or implemented by software using the CPU as follows.

In other words, the image forming device 10 may include a CPU (central processing unit) that executes commands of a control program that implements each function, a ROM (read only memory) that stores the program, a RAM (random access memory) into which the program is expanded, and other memory devices (recording media). The object of the present invention can be achieved by providing the image forming device 10 with a storage medium in which the program code (executable program, intermediate code program, source program) of the image forming device 10 control program, which is software that can implement the functions described above, can be read by a computer, and reading and executing the program code stored in the storage medium by the computer (or CPU or MPU). In particular, RAM is ideal for storing the image data in the main memory 11a.

As stated above, the image forming device according to the present embodiment forms visible images by scanning in the first scan direction and the slow scan direction at right angles to the first scan direction image data arranged in the first scan direction and the slow scan direction. The image data include actual latent image lines that constitute the actual data, and artificial latent image lines interleaved between the actual latent image lines, in the slow scan direction. A data storage unit is provided that stores image data so that the total number of scan lines when scanning in the slow scan direction from one end to the other end is an odd number.

According to the image forming device as described above, a data storage unit is provided that stores image data, which includes actual latent image lines and artificial latent image lines formed using the actual latent image lines, so that the total number of scan lines when scanning in the slow scan direction from one end to the other end is an odd number. Therefore, even if the image data are drawn reversed in the vertical direction, it is possible to maintain consistently the same part of an image as either an actual scan line or an artificial scan line. Therefore, even if reading data to form an image from one end in the slow scan direction, the image formed will have the same density as if the data had been read from the other direction. As a result, it is possible to provide an image forming device for which there is no variation in the density and tone of images formed on both sides in cases such as double-sided printing with binding on the long edge onto rectangular sheets.

Specifically, the data storage unit includes the determination unit that determines whether the total number of scan lines when scanning in the slow scan direction from one end to the other end is an even number, and the correction unit that corrects the image data so that the total number of scan lines becomes an odd number in the case that the determination unit determines that the total number of scan lines is an even number.

Preferably, the correction unit adds or subtracts one scan line when it is determined that the total number of scan lines is an even number. More preferably, the image data are developed onto sheets, and the total number of scan lines is predetermined according to the sheet size, and the determination unit determines whether the total number of scan lines is an even number from the size of the sheet.

An embodiment of the present invention further includes a printing unit that prints image data on both sides of sheets, and a control unit that controls the printing unit so that image data corrected by the correction unit is read from one end in the slow scan direction and printed onto the printing area of the first side of the sheet, then the image data are read from the other end in the slow scan direction and printed onto the printing area of the second side of the sheet.

An embodiment of the present invention has been explained above with reference to the drawings, but the present invention is not limited to the embodiment shown. Technology in which many changes and modifications are made to the embodiment described above, within the scope of the claims, or within the equivalent scope, is also within the scope of the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of an image forming device of the present invention. Accordingly, these terms, as utilized to describe the present invention should be interpreted relative to an image forming device of the present invention as normally used. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image forming device, comprising:
a reading unit being configured to read documents to obtain image data;
a data storage unit being configured to store the image data, the total number of scan lines in the image data from one end to the other end in the slow scan direction being an odd number, the data storage unit correcting the image data so that the total number of scan lines becomes an odd number if the total number of scan lines is an even number before correction thereof; and
a printing unit being configured to scan image data in a first scan direction and a slow scan direction being perpendicular to the first scan direction, the printing unit being configured to scan image data arranged in the first scan direction and the slow scan direction, the image data including actual latent image lines formed from actual data and artificial latent image lines formed using the actual data.

2. An image forming device, comprising:
a reading unit being configured to read documents to obtain image data;
a data storage unit being configured to store the image data, the total number of scan lines in the image data from one end to the other end in the slow scan direction being an odd number; and
a printing unit being configured to scan image data in a first scan direction and a slow scan direction being perpendicular to the first scan direction, the printing unit being configured to scan image data arranged in the first scan direction and the slow scan direction, the image data including actual latent image lines formed from actual data and artificial latent image lines formed using the actual data,
wherein the data storage unit includes
a determination unit that determines whether the total number of scan lines in the image data when scanned from one end to the other end in the slow scan direction is an even number, and
a correction unit that, when the total number of scan lines determined by the determination unit is an even number, corrects the image data so that total number of scan lines in the image data when scanned from one end to the other end in the slow scan direction is an odd number.

3. The image forming device according to claim 2, wherein the correction unit adds or subtracts one scan line to the total number of scan lines when it is determined that the total number of scan lines is an even number.

4. The image fanning device according to claim 2, wherein the printing unit makes the image data visible on sheets, and the total number of scan lines is determined in advance, and the determination unit determines whether the total number of scan lines is an even number from the size of the sheet.

5. The image forming device according to claim 2, further comprising
a control unit, wherein
the printing unit is configured to print the image data on both sides of sheets, and the control unit controls the printing unit so that the data corrected by the correction unit are read from one end in the slow scan direction and printed on the printing area of the first side of the sheet, and the data are read from the other end in the slow scan direction and printed on the printing area of the second side of the sheet.

6. An image forming device, comprising:
a printing unit being configured to make images visible and to form images on sheets by scanning image data in a first scan direction and a slow scan direction perpendicular to the first scan direction, the image data being arranged in the first scan direction and the slow scan direction; and
a control device being configured to control the printing unit, the control device transmitting image data, the image data including actual latent image lines formed from actual data and artificial latent image lines in the slow scan direction, to the printing unit, and the total number of scan lines in the image data from one end to the other end in the slow scan direction being corrected to an odd number when the total number of scan lines is an even number before correction thereof.

7. An image forming device, comprising:

a printing unit being configured to make images visible and to form images on sheets by scanning image data in a first scan direction and a slow scan direction perpendicular to the first scan direction, the image data being arranged in the first scan direction and the slow scan direction; and a control device being configured to control the printing unit, the control device transmitting image data, the image data including actual latent image lines formed from actual data and artificial latent image lines in the slow scan direction, to the printing unit, and the total number of scan lines in the image data from one end to the other end in the slow scan direction being an odd number, wherein the control device includes a determination unit that determines whether the total number of scan lines in the image data when scanned from one end to the other end in the slow scan direction is an even number, and a correction unit that, when the total number of scan lines determined by the determination unit is an even number, corrects the image data so that total number of scan lines in the image data when scanned from one end to the other end in the slow scan direction is an odd number.

8. The image forming device according to claim 7, wherein the correction unit adds or subtracts one scan line to the total number of scan lines when it is determined that the total number of scan lines is an even number.

9. The image forming device according to claim 7, wherein the total number of scan lines is determined in advance according to the size of the sheets, and the determination unit determines whether the total number of scan lines is an even number from the size of the sheet.

10. The image forming device according to claim 7, wherein the printing unit is configured to print the image data on both sides of sheets, and the control device controls the printing unit so that the data corrected by the correction unit are read from one end in the slow scan direction and printed on the printing area of the first side of the sheet, and the data are read from the other end in the slow scan direction and printed on the printing area of the second side of the sheet.

* * * * *